US010832465B2

(12) United States Patent
Saleh (10) Patent No.: US 10,832,465 B2
(45) Date of Patent: Nov. 10, 2020

(54) USE OF WORKGROUPS IN PIXEL SHADER (71) Applicant: Advanced Micro Devices, Inc., Santa Clara, CA (US)

(72) Inventor: Skyler Jonathon Saleh, La Jolla, CA (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 16/219,787

(22) Filed: Dec. 13, 2018

(65) Prior Publication Data
US 2020/0193673 A1 Jun. 18, 2020

(51) Int. Cl.
*G06T 15/00* (2011.01)
(52) U.S. Cl.
CPC .................. *G06T 15/005* (2013.01)
(58) Field of Classification Search
CPC ...................................... G06T 15/005
USPC .......................................... 345/501
See application file for complete search history.

(56) References Cited

U.S. PATENT DOCUMENTS

| 7,477,255 B1* | 1/2009 | Lindholm ............. G06T 15/005 345/501 |
| 7,737,983 B2* | 6/2010 | Brothers ............... G06F 9/3879 345/506 |
| 7,755,632 B2* | 7/2010 | Brothers ............... G06F 9/3879 345/502 |
| 7,788,468 B1* | 8/2010 | Nickolls ............. G06F 9/30087 712/22 |
| 2010/0110089 A1* | 5/2010 | Paltashev .................. G06T 1/20 345/522 |
| 2011/0018874 A1* | 1/2011 | Hasselgren ............. G06T 15/40 345/420 |
| 2018/0314520 A1* | 11/2018 | Tirumala ............... G06F 9/3009 |

* cited by examiner

*Primary Examiner* — Jacinta M Crawford
(74) *Attorney, Agent, or Firm* — Volpe Koenig (57) ABSTRACT

A technique for executing pixel shader programs is provided. The pixel shader programs are executed in workgroups, which allows access by work-items to a local data store and also allows program synchronization at barrier points. Utilizing workgroups allows for more flexible and efficient execution than previous implementations in the pixel shader stage. Several techniques for assigning fragments to wavefronts and workgroups are also provided. The techniques differ in the degree of geometric locality of fragments within wavefronts and/or workgroups. In some techniques, a greater degree of locality is enforced, which reduces processing unit occupancy but also reduces program complexity. In other techniques, a lower degree of locality is enforced, which increases processing unit occupancy.

20 Claims, 8 Drawing Sheets

USE OF WORKGROUPS IN PIXEL SHADER

BACKGROUND

Graphics processing pipelines include a number of programmable shader stages that execute shader programs to perform certain processing tasks for rendering. A pixel shader stage colors fragments based on a pixel shader program, vertex attributes, and, potentially, textures. Improvements in pixel shaders are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for executing pixel shader programs is provided. The pixel shader programs are executed in workgroups, which allows access by work-items to a local data store and also allows program synchronization at barrier points. Utilizing workgroups allows for more flexible and efficient execution than previous implementations in the pixel shader stage. Several techniques for assigning fragments to wavefronts and workgroups are also provided. The techniques differ in the degree of geometric locality of fragments within wavefronts and/or workgroups. In some techniques, a greater degree of locality is enforced, which reduces processing unit occupancy but also reduces program complexity. In other techniques, a lower degree of locality is enforced, which increases processing unit occupancy.

Figure 1:
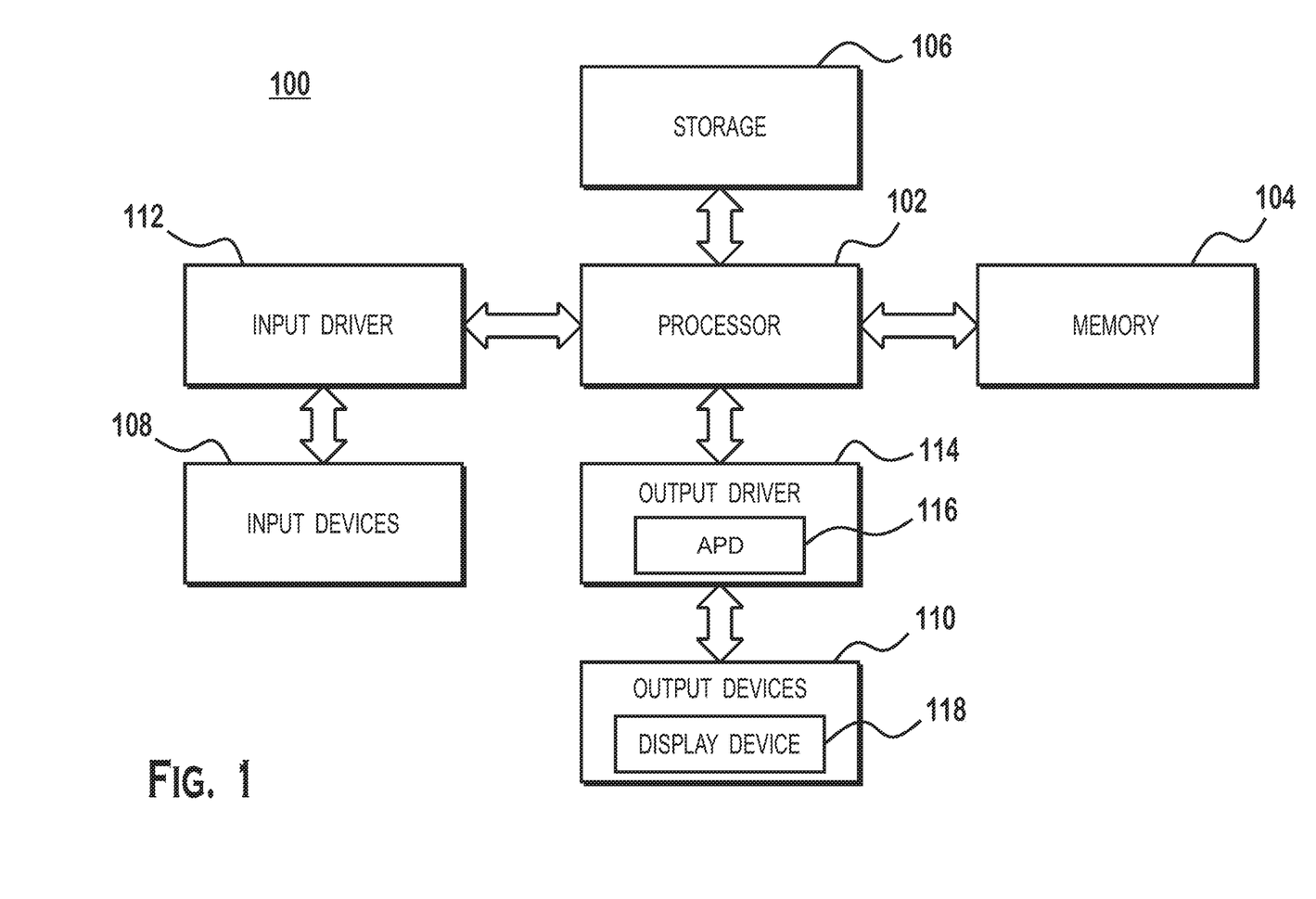
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118.

Figure 2:
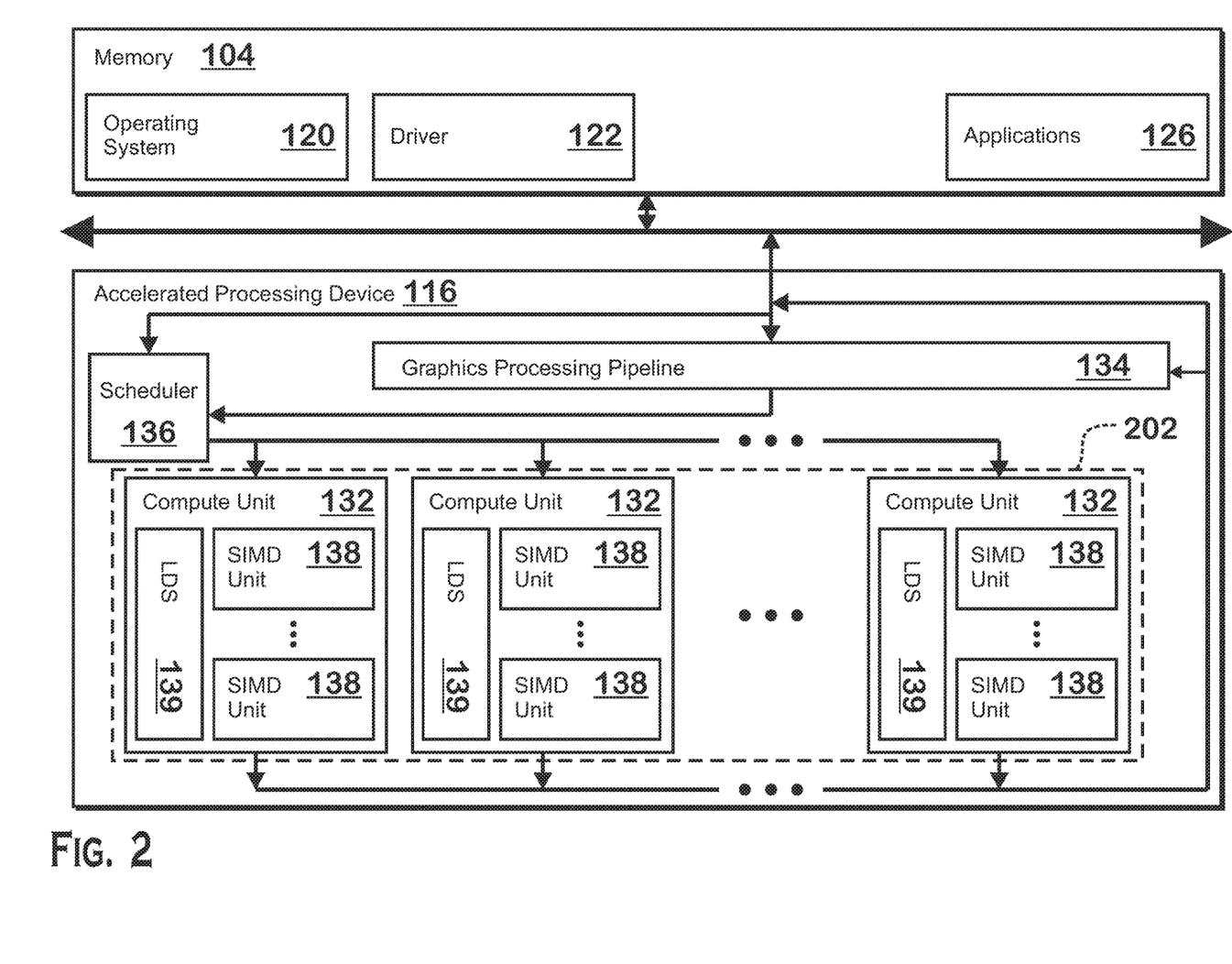
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing.

The APD 116 executes commands and programs for selected functions, such as graphics operations and nongraphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

Compute units 132 also include a local data store 139 ("LDS") that serves as a memory for shader programs executing within the compute units 132. A LDS 139 is accessible to SIMD units 138 of that compute unit 132 and thus is accessible to the work-items, wavefronts, and workgroups executing in that compute unit 132. An LDS 139 is not accessible to SIMD units 138 outside of the compute unit 132 in which the LDS 139 resides.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles.

One or more wavefronts are included in a "workgroup," which includes a collection of wavefronts designated to execute the same program. Workgroups are characterized in that wavefronts that belong to a workgroup are able to communicate with each other by accessing data in a local data store within the compute unit 132 the workgroup is executing on. Workgroups are also characterized in that wavefronts in a workgroup can be synchronized. More specifically, shader programs that execute together as a workgroup may include a synchronization token. Wavefronts in a workgroup are not allowed to proceed past the synchronization token until the synchronization token condition is met. One example of a synchronization token condition is that all wavefronts have arrived at the synchronization token. Another example of a synchronization token condition is that all wavefronts have completed any outstanding memory accesses (either of a certain type, such as writes or reads, or all memory accesses).

A workgroup can be executed by executing each of the wavefronts that make up the workgroup. In alternatives, the wavefronts are executed on a single SIMD unit 138 or on different SIMD units 138 of a compute unit 132. In some implementations, a workgroup executes on one or more SIMD units 138 of a single compute unit 132 but does not execute on two or more different compute units 132. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
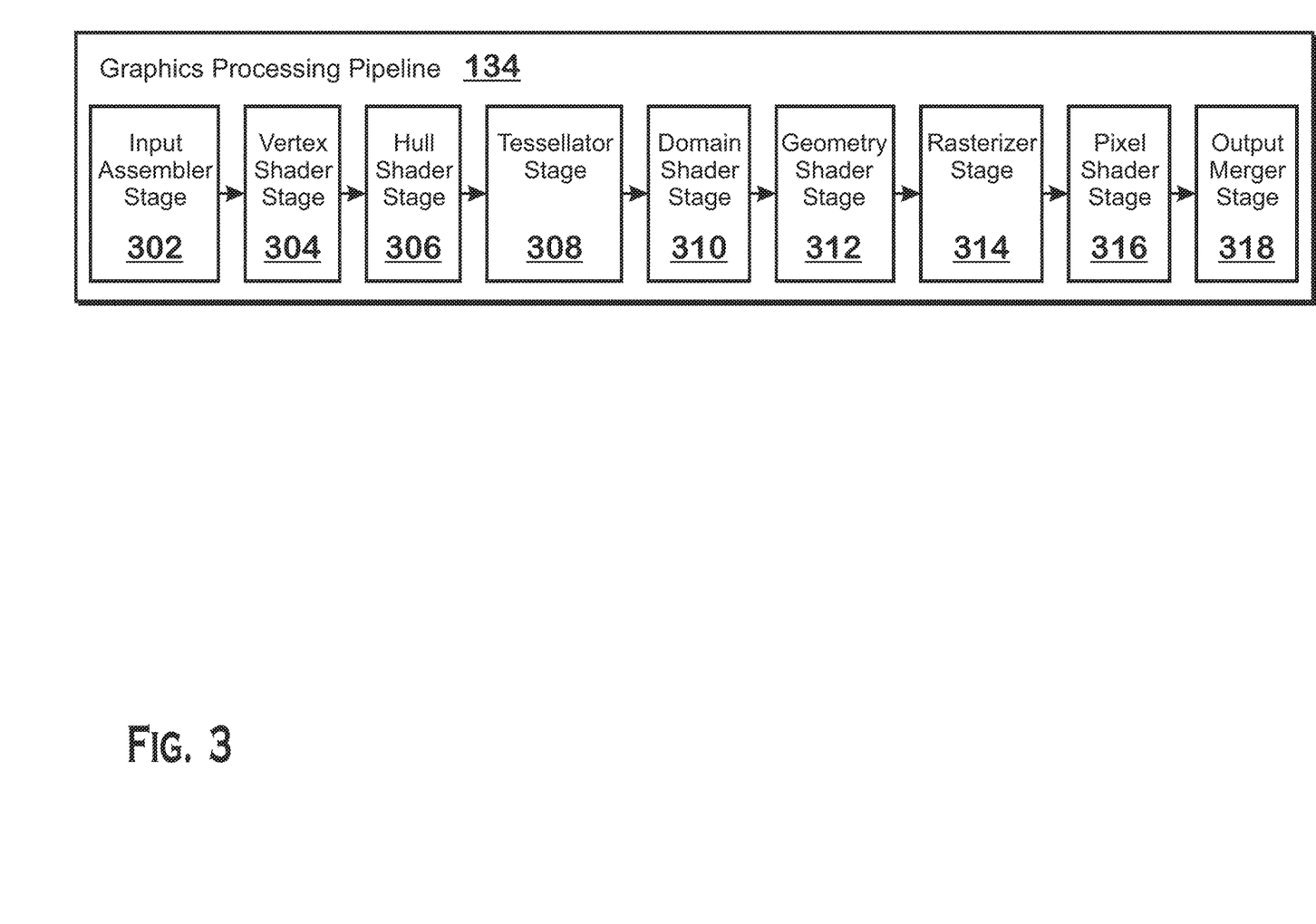
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

In some modes of execution, it is possible for shader programs to be executed without using workgroups. In such modes of execution, wavefronts do not use LDS to communicate with each other and wavefronts are not synchronized with each other, instead executing independently. In some modes of execution, a shader program cannot explicitly access the LDS, which is reserved for special purpose uses. In an example, in one technique for executing pixel shader programs, the scheduler 136 launches wavefronts that are not part of a workgroup. In such a technique, the scheduler 136 stores parameters for use by the pixel shader program in the LDS 139, which is not explicitly accessible by the pixel shader program (e.g., by address). Instead, the LDS 139 is accessible only by referring to the parameters. In addition, in this mode of execution, no pixel shader wavefront is able to synchronize with other pixel shader wavefronts. The present disclosure describes techniques for utilizing workgroups in pixel shaders.

Figure 4:
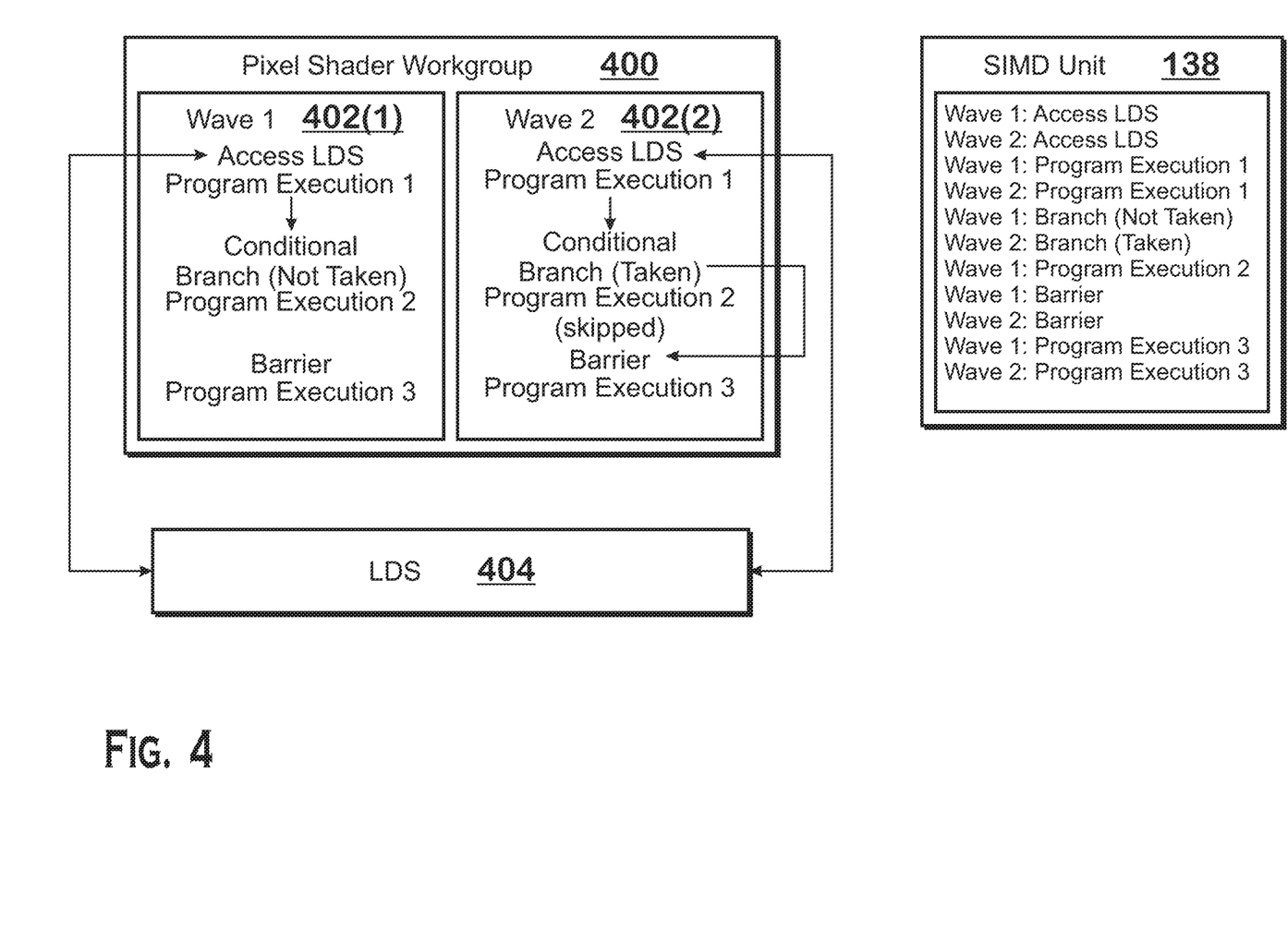
FIG. 4 illustrates execution of a pixel shader workgroup in an accelerated processing device, according to an example.

FIG. 4 illustrates execution of a pixel shader workgroup 400 in the APD 116, according to an example. The pixel shader workgroup 400 is a workgroup launched to execute a particular pixel shader program. As described elsewhere herein, a workgroup is often launched with multiple wavefronts (labeled "waves" in FIG. 4). For any particular workgroup, the waves are launched with the same pixel shader program. However, each work-item is launched to process different data. In the pixel shader stage 316, the data for each work-item at least includes a different fragment generated by the rasterizer stage 314 (and thus a different screen location within a triangle).

The wavefronts in a workgroup are able to communicate with each other using the LDS 139. Specifically, any work-item in a wavefront is able to write to the LDS 139 or to read from the LDS 139. This capability allows for work-items to communicate with each other in processing pixels. An advantage of this approach include the ability to reduce the total workload involved with executing a pixel shader program by allowing certain portions of a pixel shader program to be performed by fewer wavefronts than used for other portions of the pixel shader program, which reduces the total amount of computing time of the pixel shader program. In operation, SIMD units 138 are oversubscribed, with different wavefronts time-sharing the processing resources of the SIMD units 138. If some wavefronts are switched off for certain portions of shader programs, then the wavefronts that are on for those portions are able to be processed on the SIMD units 138 for a greater portion of the time.

FIG. 4 illustrates a portion of an example shader program, along with the manner in which that portion is executed by two wavefronts 402 (shown as "waves" in FIG. 4). In this example, the shader program includes an instruction to access the LDS 404. After the instruction to access the LDS are additional instructions labeled "program execution 1," which may include any instructions executable by the pixel shader workgroup 400. Then, the shader program has a conditional that checks whether the work-item id is a particular value, and executes a section of code ("program execution 2," also referred to herein as a "conditional section of code"). For wave 1 402(1), this conditional executes as true, and thus the branch is not taken and program execution 2 occurs. For wave 2 402(2), the conditional executes as false, and thus the branch is taken and wave 2 402(2) does not execute program execution 2. After the conditional section of code is a barrier instruction that causes all wavefronts of a workgroup to wait until all other wavefronts have arrived at the barrier instruction in order to proceed past the barrier instruction. After the barrier instruction is program execution 3.

Wave 2 402(2) waits to continue execution until after wave 1 402(1)—the other wavefront in the workgroup 400—arrives at the barrier instruction. Because wave 1 402(1) does not take the branch, wave 1 402(1) performs program execution 2. Because wave 2 402(2) does not execute while wave 1 402(1) executes program execution 2, the time-slots on the SIMD unit 138 in which wave 2 402(2) is resident are used for other wavefronts. In one example, wave 1 402(1) and wave 2 402(2) execute on the SIMD unit 138 in a time-shared manner. The time-slots used by wave 2 402(2) could be used for wave 1 402(1) while wave 1 402(1) is executing program execution 2, so that wave 1 402(1) executes faster than if wave 1 402(1) were not using those time slots. In any case, the time slots not used by wave 2 402(2) could speed up execution of other wavefronts. Once wave 1 402(1) completes program execution 2 and arrives at the barrier instruction, wave 2 402(2) (the only other wavefront of the workgroup 400 in the example of FIG. 4) resumes execution.

An example of execution in a single SIMD unit 138 is also illustrated on the right side of FIG. 4. In this example, as with the example described above, the workgroup 400 includes two wavefronts which execute on a single SIMD unit 138 in a time-shared manner. In this example, wave 1 accesses the LDS and then wave 2 accesses the LDS. Then wave 1 performs program execution 1 and wave 2 performs program execution 1. Then wave 1 evaluates the conditional and does not take the branch and wave 2 evaluates the conditional and does take the branch. Wave 1 performs program execution 2, but wave 2 does not. Wave 1 performs the barrier instruction and wave 2 performs the barrier instruction. Wave 1 performs program execution 3 and wave 2 performs program execution 3.

As is clear from the above, using workgroups for pixel shaders allows workgroups executing pixel shaders to "shrink and grow" as execution proceeds. "Shrinking" means that the "occupancy"—the number of wavefronts that execute a particular section of a shader program—is reduced as compared to the number of wavefronts launched to execute a workgroup, while "growing" means the occupancy increases.

In some implementations, that pixel shader programs are configured to receive one fragment to shade from an earlier stage (such as the rasterizer stage 314) and to output one shaded fragment. Thus regardless of the manner in which a particular pixel shader program shrinks or grows during execution, the pixel shader program begins execution with a fixed number of wavefronts governed by the number of fragments to be shaded and ends execution with the same number of wavefronts. In addition, each work-item is launched to shade a particular fragment and outputs the shaded version of that fragment.

One challenge in facilitating workgroup execution for pixel shader programs is the manner in which fragments are assigned to work-items of a workgroup. Specifically, grouping fragments from different triangles together in a single workgroup would present certain issues. For example, in pixel shader programs, it is possible to refer to data associated with a particular screen position. In an example, a portion of a pixel shader program calculates a lighting value for a particular screen area and stores that value in the LDS. A subsequent portion of the pixel shader program reads the LDS and modifies a color, derived from a texture sampling operation, based on the lighting value. However, if fragments from different triangles were grouped together in a workgroup, then a work-item for one triangle could color its fragment based on lighting from another triangle. In general, allowing a work-item to access values calculated for a triangle not assigned to the work-item could lead to unexpected or nonsensical results.

Figure 5A:
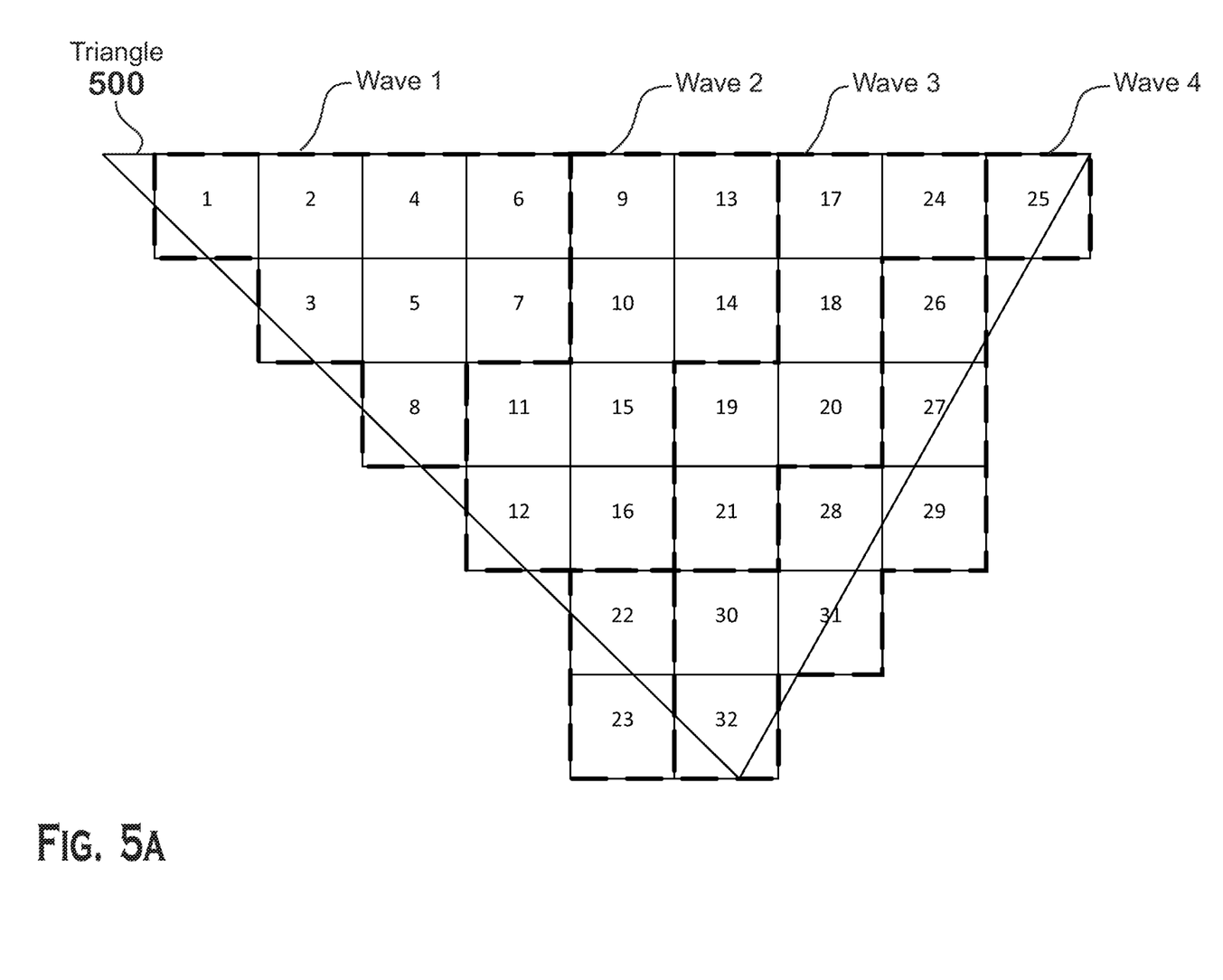
FIGS. 5A-5C present alternate packing techniques for assigning fragments of a triangle to wavefronts and workgroups that execute a shader program, according to an example.
Figure 5B:
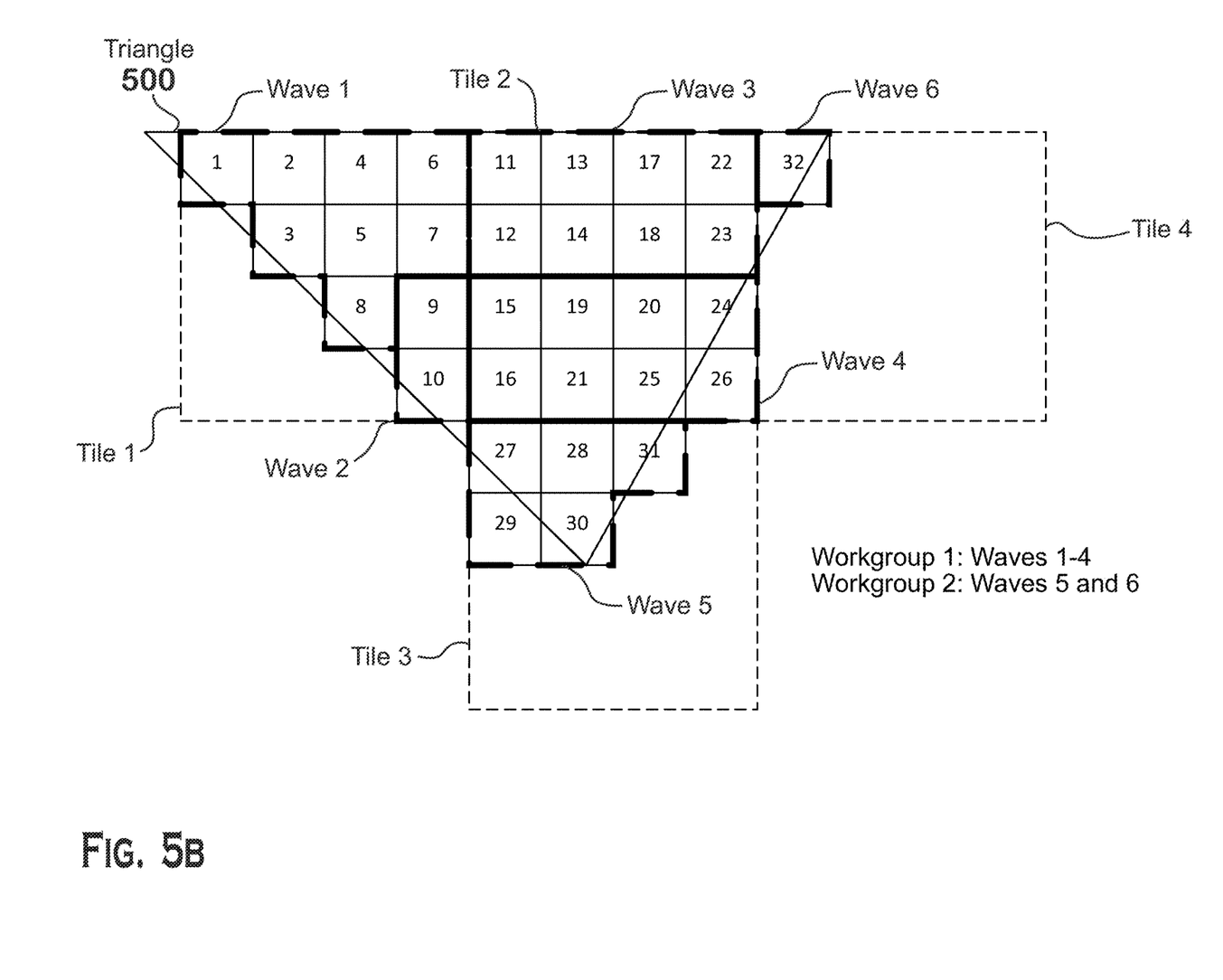
Figure 5C:
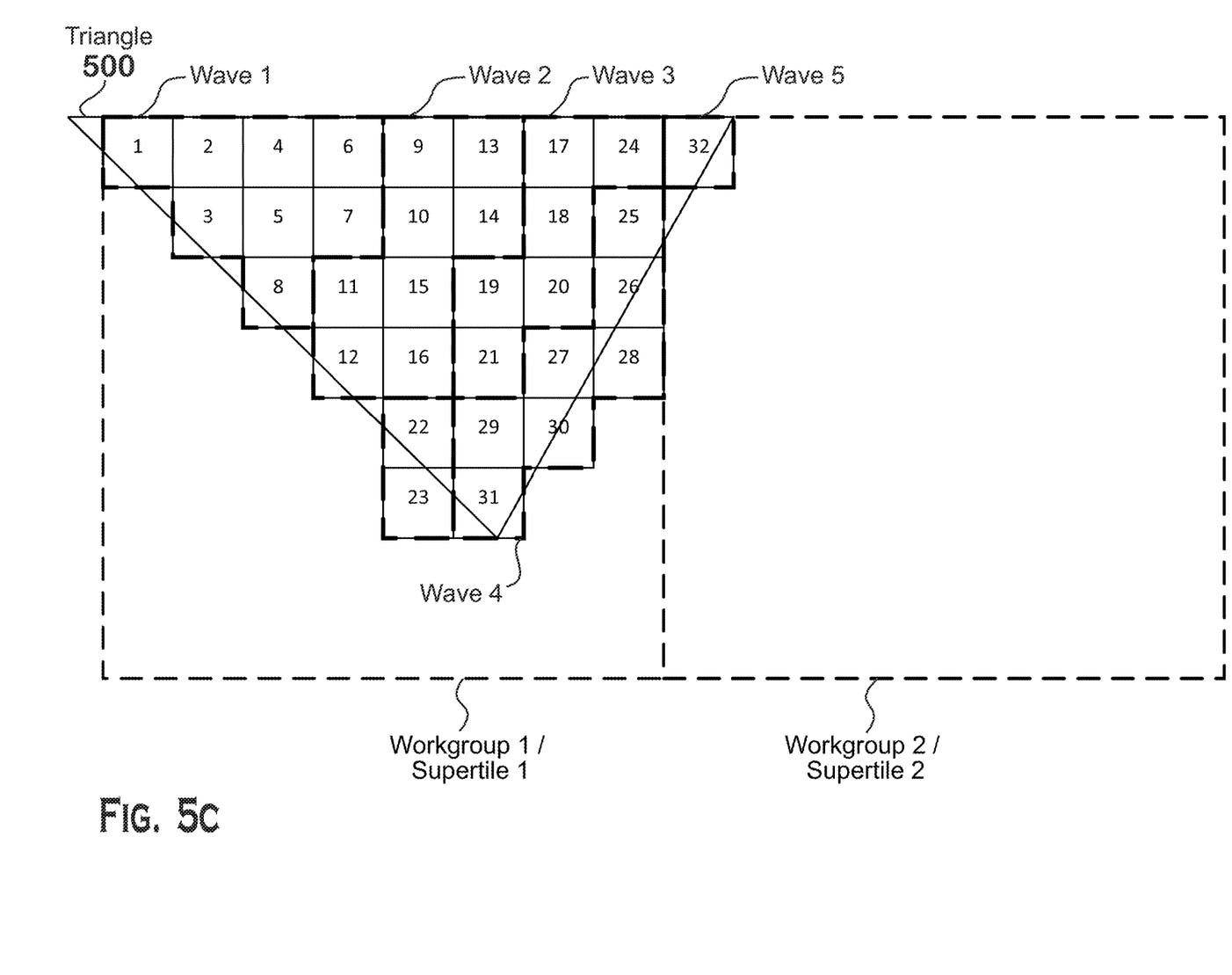

Therefore, FIGS. 5A-5C present alternate packing techniques for assigning fragments of a triangle to wavefronts and workgroups that execute a shader program. These figures illustrate the manner in which the scheduler 136 launches workgroups and wavefronts to execute on the compute units 132, based on fragments generated by the rasterizer stage 314.

Each of FIGS. 5A-5C illustrates a triangle 500, the screen positions covered (illustrated as squares with numbers inside) by the triangle 500, and the wavefronts to which the different screen positions are assigned. FIG. 5C also illustrates different workgroups that the different wavefronts are assigned to (FIGS. 5A and 5B do not illustrate different workgroups because all wavefronts in those examples are included in a single workgroup).

In FIG. 5A, the scheduler 136 assigns fragments to wavefronts in the order in which those fragments are received from previous stages in the pipeline (such as the rasterizer stage 314 or a culling unit, which culls fragments based on their z- (or depth-) values). As can be seen in FIG. 5A, there is no particular geometric relationship between the different fragments, except that the rasterization stage 314 may process fragments of a triangle in a particular order and thus would output those fragments in that order. However, it should be understood that the technique of FIG. 5A does not require that fragments being assigned to a particular wavefront have any particular geometric relationship. It should also be understood, however, that all fragments that are assigned to a particular wavefront, and to a particular workgroup, are within the same triangle. To assign the fragments to a wavefront in the manner illustrated, the scheduler 136 accumulates fragments received from a unit upstream of the pixel shader stage 316 (such as the rasterizer stage 314 or a z-cull unit) and, when a sufficient number are received (e.g., when a number that would fill a wavefront is received or when the last fragment for a triangle is received), launches a wavefront for that set of fragments.

The particular fragments illustrated in FIG. 5A are numbered from 1-32. In the figure illustrated, each wavefront has a capacity of 8 fragments. Thus four wavefronts process the 32 fragments of FIG. 5A. Wave 1 is assigned fragments 1-8, wave 2 is assigned 9-16, wave 3 is assigned 17-24, and wave 4 is assigned 25-32. As described elsewhere herein, the wavefronts may communicate with each other via the local data store 139 and may also synchronize via barrier instructions.

The lack of geometric constraints on fragments assigned to a wavefront means that a pixel shader program written to process fragments according to the scheme of FIG. 5A may be somewhat complicated. Specifically, pixel shader programs can make fewer assumptions about which fragments are scheduled to execute together in a single wavefront, where making such assumptions could reduce shader program size, completion time, and complexity.

Thus FIG. 5B presents a different technique for grouping fragments into wavefronts and workgroups. In this technique, the scheduler 136 assigns a tile of screen positions (e.g., 4×4 pixels) to each wavefront and assigns fragments within that tile, but not outside of that tile, to that wavefront. If the tile is larger than the number of fragments that can fit in a wavefront, then the scheduler 136 launches multiple wavefronts for a tile.

In the example of FIG. 5B, the triangle includes fragments 1-32. Waves 1 and 2 are both in tile 1. Wave 1 is assigned fragments 1-8, and wave 2 is assigned fragments 9 and 10, and all of these fragments are in tile 1. Wave 3 is assigned fragments 11-14, 17-18, and 22-23 and wave 4 is assigned fragments 15-16, 19-21, and 24-26, and all of these fragments are in tile 2. Wave 5 is assigned fragments 27-31, which are in tile 3. Wave 6 is assigned fragment 32 and is in tile 4. Because in this example workgroups can have a maximum of 4 wavefronts, wavefronts 1-4 are assigned to workgroup 1 and wavefronts 5-6 are assigned to workgroup 2.

The technique of FIG. 5B provides a high degree of wavefront locality but, as can be seen from the example, reduces the processing efficiency by reducing the number of fragments assigned to the different wavefront, thus requiring more wavefronts to be executed. Because of the SIMD nature of the SIMD units 138, this reduced wavefront occupancy results in SIMD lanes that are unused for at least some of the wavefronts.

FIG. 5C presents a third technique for assigning fragments to wavefronts and workgroups in which workgroups are limited to a "supertile" but wavefronts are not limited to tiles, according to an example. A "supertile" is larger than a tile of FIG. 5B.

In FIG. 5C, fragments 1-8 are assigned to wave 1. Fragments 9-16 are assigned to wave 2. Fragments 17-24 are assigned to wave 3. Fragments 25-31 are assigned to wave 4. Fragment 32 is outside of the supertile of fragments 1-31 and is thus not assigned to any wavefront in the workgroup that includes waves 1-4. Instead, workgroup 2, with wave 5, processes fragment 32. This technique represents a tradeoff between the improvements in processing speed and program complexity achieved by limiting wavefronts to a particular geometric area while also improving SIMD occupancy as compared with the technique of FIG. 5B.

In some implementations, the rasterizer stage 314 generates fragments as quads, which are 2×2 groups of fragments. Quads are useful for calculating derivatives in sampling textures and are often used in 3D graphics processing pipelines. In implementations in which rasterizer stages 314 generate quads, fragments in quads are not split up but are assigned together to wavefronts.

In some implementations, a compute unit 132 is capable of performing two or three of the techniques of FIGS. 5A-5C. In some implementations, the compute unit 132 is able to switch between the different techniques, in response to a command processed by the scheduler 136 (for example, received from the processor 102).

Figure 6:
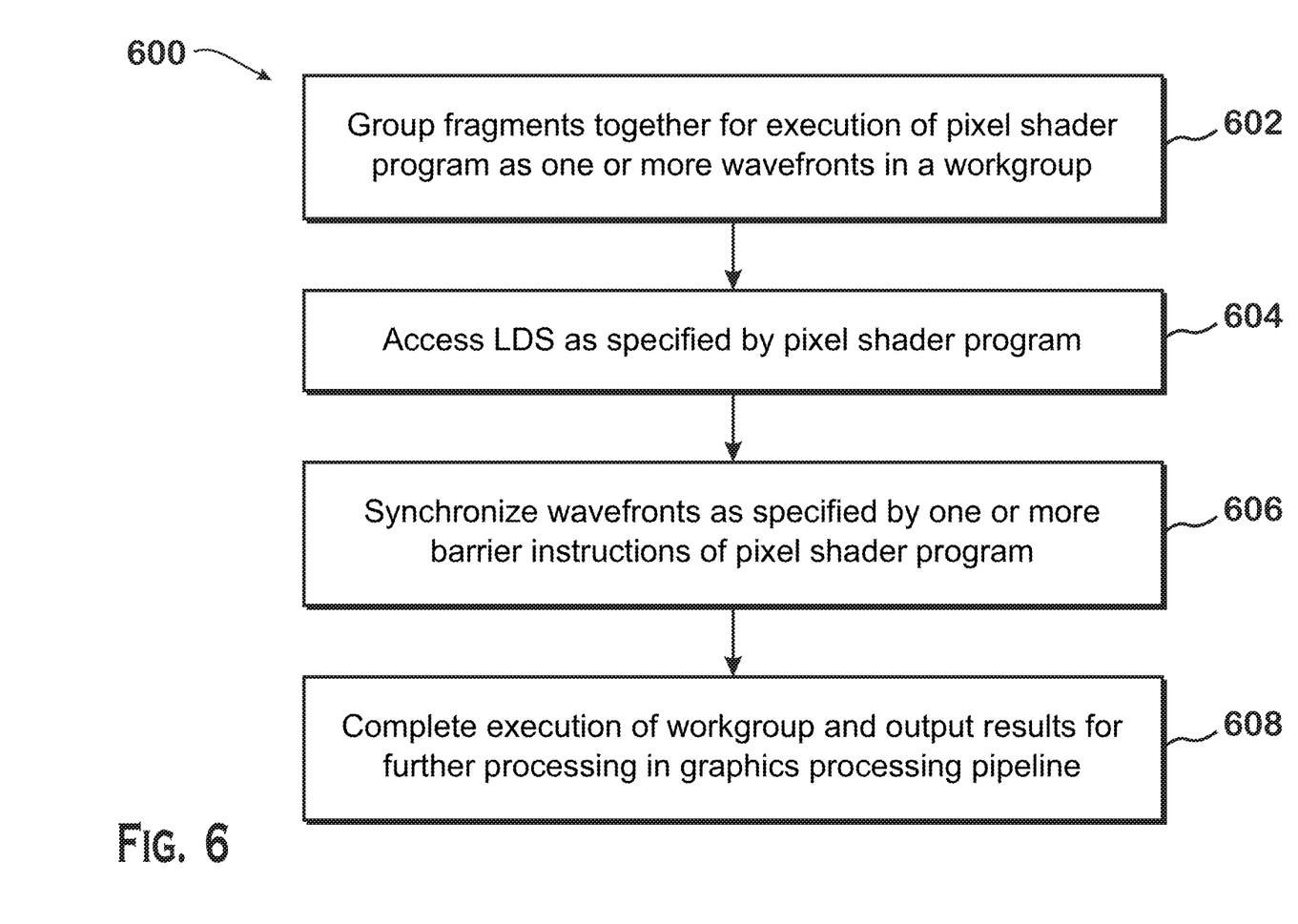
FIG. 6 is a flow diagram of a method for executing pixel shader programs in workgroups, according to an example.

FIG. 6 is a flow diagram of a method 600 for executing pixel shader programs in workgroups, according to an example. Although described with respect to the system of FIGS. 1-5C, those of skill in the art will recognize that any system configured to perform the steps of the method 600 in any technically feasible order falls within the scope of the present disclosure.

The method 600 begins at step 602, where a scheduler 136 groups fragments together for execution of a pixel shader program as one or more wavefronts in a workgroup on a compute unit 132. Any of the techniques of FIGS. 5A-5C may be used to group the fragments together, or any other technically feasible technique may be used. At step 604, the compute unit 132 accesses the local data store 139 as explicitly requested by the shader program. For example, the pixel shader program may request to read an address dependent on lane ID, and the compute unit 132 accesses that address. At step 606, the compute unit 132 synchronizes wavefronts as specified by one or more barrier instructions of the pixel shader program. At step 608, the compute unit 132 completes execution of the workgroup and outputs results for further processing in a graphics processing pipeline 134. It should be understood that whether steps 604 or 606 are executed, and when they are executed, are dependent on the instructions of the shader program that is executed.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for executing a pixel shader program, the method comprising:
   grouping fragments together for execution of the pixel shader program as two or more wavefronts in a workgroup, wherein wavefronts include one or more work-items, each of which is assigned to a different fragment, and wherein fragments from different triangles are prevented from being grouped together in a single workgroup;
   accessing a local data store as specified by the pixel shader program;
   synchronizing the wavefronts as specified by one or more barrier instructions of the pixel shader program; and
   completing execution of the workgroup and outputting results for further processing in a graphics processing pipeline.

2. The method of claim 1, wherein synchronizing the wavefronts comprises preventing each wavefront of the workgroup from proceeding past a barrier instruction until all wavefronts of the workgroup have arrived at the barrier instruction.

3. The method of claim 1, further comprising:
   decreasing and increasing occupancy of at least one wavefront in a compute unit based on instructions of the pixel shader program.

4. The method of claim 3, wherein:
   a first wavefront of the workgroup executes a conditional section of the pixel shader program and a second wavefront does not execute the conditional section of the pixel shader program; and
   decreasing and increasing occupancy of the at least one wavefront comprises decreasing occupancy of the second wavefront at the conditional section and increasing occupancy of the second wavefront after the conditional section.

5. The method of claim 4, wherein decreasing occupancy of the second wavefront comprises providing a time-slot assigned to the second wavefront to a different wavefront instead.

6. The method of claim 1, wherein the fragments grouped together into the wavefronts are grouped together in quads.

7. The method of claim 1, wherein grouping the fragments together comprises grouping the fragments in the order received from a unit prior to a pixel shader stage of a pixel shader pipeline.

8. The method of claim 1, wherein grouping the fragments together comprises restricting fragments in a wavefront to tiles.

9. The method of claim 1, wherein grouping the fragments together comprises restricting fragments in a workgroup to super tiles.

10. An accelerated processing device ("APD") for executing a pixel shader program, the APD comprising:
- a scheduler configured to:
  - group fragments together for execution of the pixel shader program as two or more wavefronts in a workgroup, wherein fragments from different triangles are prevented from being grouped together in a single workgroup;
- a compute unit configured to:
  - access a local data store as specified by the pixel shader program,
  - synchronize the wavefronts as specified by one or more barrier instructions of the pixel shader program, and
  - complete execution of the workgroup and output results for further processing in a graphics processing pipeline.

11. The APD of claim 10, wherein synchronizing the wavefronts comprises preventing each wavefront of the workgroup from proceeding past a barrier instruction until all wavefronts of the workgroup have arrived at the barrier instruction.

12. The APD of claim 10, wherein the compute unit is further configured to:
- decrease and increase occupancy of at least one wavefront based on instructions of the pixel shader program.

13. The APD of claim 12, wherein:
- a first wavefront of the workgroup executes a conditional section of the pixel shader program and a second wavefront does not execute the conditional section of the pixel shader program; and
- decreasing and increasing occupancy of the at least one wavefront comprises decreasing occupancy of the second wavefront at the conditional section and increasing occupancy of the second wavefront after the conditional section.

14. The APD of claim 13, wherein decreasing occupancy of the second wavefront comprises providing a time-slot assigned to the second wavefront to a different wavefront instead.

15. The APD of claim 10, wherein the fragments grouped together into the wavefronts are grouped together in quads.

16. The APD of claim 10, wherein grouping the fragments together comprises grouping the fragments in the order received from a unit prior to a pixel shader stage of a pixel shader pipeline.

17. The APD of claim 10, wherein grouping the fragments together comprises restricting fragments in a wavefront to tiles.

18. The APD of claim 10, wherein grouping the fragments together comprises restricting fragments in a workgroup to super tiles.

19. A computing device comprising:
- a processor; and
- an accelerated processing device ("APD") for executing a pixel shader program received from the processor, the APD comprising:
  - a scheduler configured to:
    - group fragments together for execution of the pixel shader program as two or more wavefronts in a workgroup, wherein fragments from different triangles are prevented from being grouped together in a single workgroup;
  - a compute unit configured to:
    - access a local data store as specified by the pixel shader program,
    - synchronize the wavefronts as specified by one or more barrier instructions of the pixel shader program, and
    - complete execution of the workgroup and output results for further processing in a graphics processing pipeline.

20. The computing device of claim 19, wherein synchronizing the wavefronts comprises preventing each wavefront of the workgroup from proceeding past a barrier instruction until all wavefronts of the workgroup have arrived at the barrier instruction.

* * * * *